(No Model.)
C. J. VAN DEPOELE.
GENERATOR FOR PULSATING CURRENTS.
No. 440,977. Patented Nov. 18, 1890.
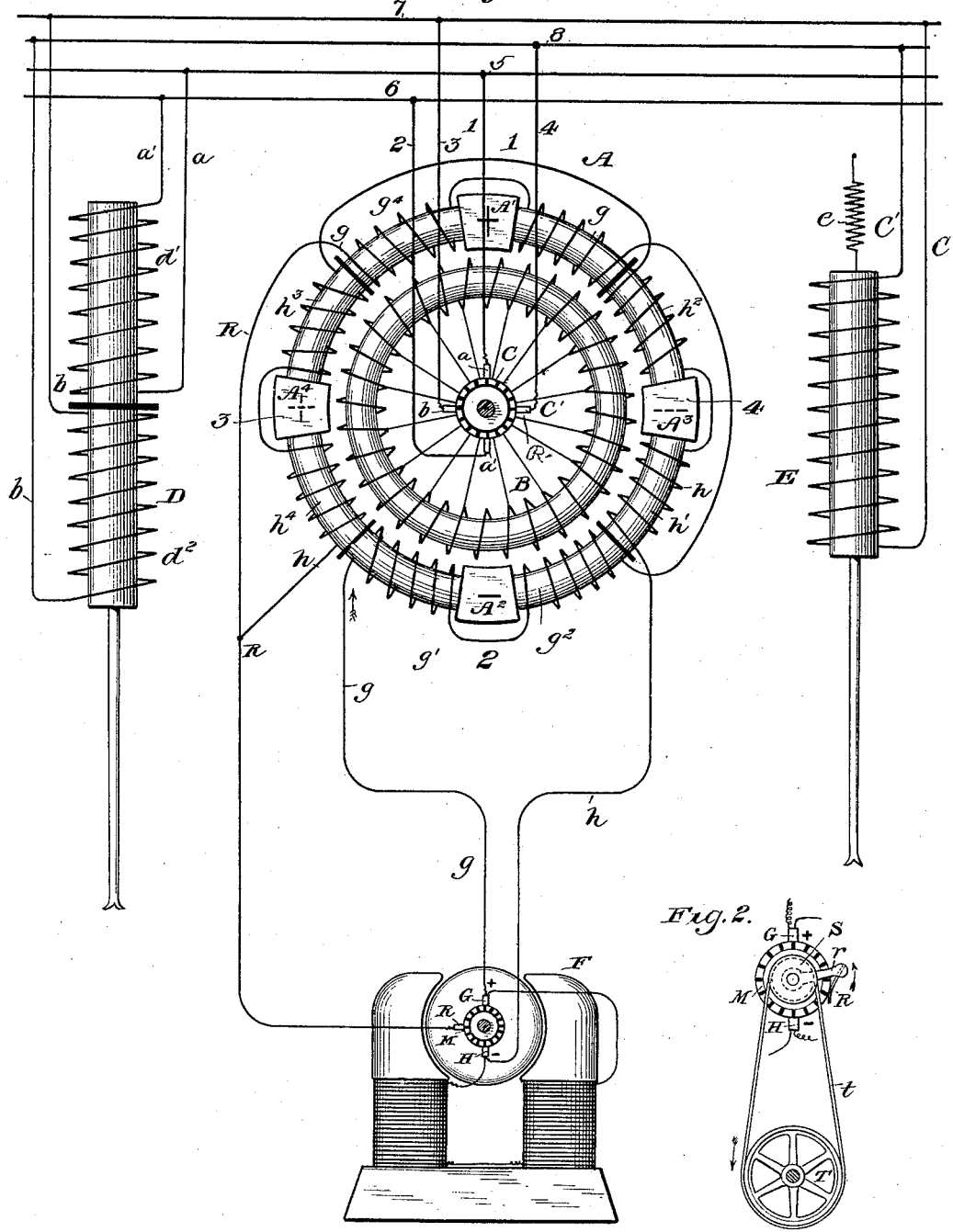
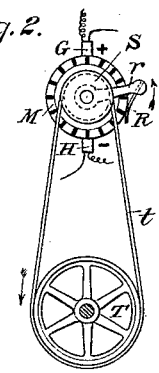
Witnesses
H. A. Lamb
C. S. Sturtevant
Inventor
Charles J. Van Depoele
By his Attorney
Frankland Jannus

UNITED STATES PATENT OFFICE.

CHARLES J. VAN DEPOELE, OF LYNN, MASSACHUSETTS.

GENERATOR FOR PULSATING CURRENTS.

SPECIFICATION forming part of Letters Patent No. 440,977, dated November 18, 1890.

Application filed April 17, 1890. Serial No. 348,375. (No model.)

*To all whom it may concern:*

Be it known that I, CHARLES J. VAN DEPOELE, a citizen of the United States, residing at Lynn, in the county of Essex and State of Massachusetts, have invented certain new and useful Improvements in Generators for Pulsating Currents, of which the following is a description, reference being had to the accompanying drawings, and to the letters and figures of reference marked thereon.

My invention relates to a system of generating pulsating or rising and falling electric currents—such currents, for example, as are suited to the operation of electro-dynamic reciprocating engines of the type described and claimed in my Patents Nos. 400,809, of April 2, 1889, and 401,231, of April 9, 1889, and in subsequent patents.

By this invention I am enabled to supply rising and falling or defined currents to the motor-coils of reciprocating engines or to working-circuits supplying said coils direct from stationary commutator-brushes upon the commutator of the generator without the use of moving brushes at the generator or source, as set forth in my Patent No. 422,855, of March 4, 1890, and the several divisions thereof. The means whereby the generator is adapted to produce rising and falling currents comprise, broadly, a double or four-pole field-magnet, and a continuous-current armature having a sectional commutator provided with four commutator-brushes at equidistant points, each pair of brushes being in circuit with one of the motor-coils of the engine. The generator is further provided with a laminated or finely-divided field-magnet core and means for alternately energizing the two sets of field-magnet poles. The said sets of field-magnet poles may each time be energized as of the same polarity, so that the currents delivered to the line will succeed each other in their respective circuits without change of direction; but, if desired, the field-magnet poles of the generator may with equal facility be energized as of alternate polarity, thereby sending current of alternating direction to the respective working-circuits.

The details of an arrangement and organization of apparatus embodying the invention will be hereinafter fully set forth and described, and referred to in the appended claims.

In the accompanying drawings, Figure 1 is a diagrammatic view showing the electrical construction of the generator, the exciter, working-circuits, and translating devices. Fig. 2 is a detail view showing a brush-moving apparatus.

As indicated in the drawings, the generator A comprises what I have for convenience called a "double field-magnet," the same being provided with four equidistant poles $A'$ $A^2$ $A^3$ $A^4$. The iron parts of said field-magnet should be finely divided, as by building the same up from sheet metal, or by forming the core of iron wire, or otherwise, as may be convenient. The armature B is, as indicated, of the well-known Gramme type, and is provided with a sectional commutator C, which is provided with two pairs of commutator-brushes $a$ $a'$ $b$ $b'$. The commutator-brushes form two pairs, which are connected by conductors 1 2 3 4 with the translating devices, which, as here shown, receive current from a working-circuit 5 6 7 8, to which the commutator-brushes are connected through their conductors 1 2 3 4.

Two forms of reciprocating engines are seen connected with the working-circuit—viz., a double-coil engine D and a single-coil engine E. The two terminals of the single-coil engine E are connected to one-half of the working-circuit 7 8, and said engine will therefore receive the current impulses sent to line through the commutator-brushes $b$ $b'$, the coils thereof being arranged as set forth in my said prior patent to produce movement of a magnetic piston in one direction, the return-stroke being effected by a suitable spring $e$.

The engine D is provided with two motor-coils $d'$ $d^2$, and the terminals of the coils $d'$ are connected with the working-circuits 5 6, so as to receive current from the commutator-brushes $a$ $a'$, while the terminals of the coil $d^2$ are connected to the circuit-conductors 7 8 and receive their current through the opposite pair of commutator-brushes $b$ $b'$. To produce alternate magnetization of the two sets of field-magnet poles of the generator, the said field-magnet winding is divided into two circuits, through which current is alternately directed from a suitable source—as, for example, from a separate exciter F, which may, as shown, be a self-excited shunt-wound continuous-current generator—although other means could be employed. The exciter F has the usual stationary main commutator-brushes G H, to each of which is respectively attached one terminal of the duplex field-magnet circuit.

Conductor $g$ extends from the brush G and is wound upon the cores $g'$ $g^2$ $g^3$ $g^4$, energizing the poles $A'$ $A^2$ of the field-magnet. The conductor $g$, on leaving the core $g^4$, is connected to the conductor R, which said conductor returns to the exciter and is connected to a third commutator-brush M, arranged to be moved about the commutator between the points of maximum and zero electro-motive force—that is, from one fixed brush to the other. The other field-magnet circuit starts from the brush H, and as conductor $h$ traverses the cores $h'$ $h^2$ $h^3$ $h^4$, issuing at the extremity of the core $h^4$, and being also connected to the conductor R, representing the moving brush M of the exciter. Current flowing through the conductor $h$ will therefore energize the field-magnet poles $A^3$ $A^4$.

The armature of the generator is to be rotated by a suitable power and at its most efficient speed. So, also, should be the armature of the exciter F. If, now, the movable brush M upon the exciter is moved around the commutator—as, for example, by any of the means set forth in my said patent No. 422,855—the current from the said exciter will flow through the circuit $g$ R, and after having completed half a rotation upon the commutator the current will have fallen to zero in the said circuit $g$ R and will be maximum in the circuit $h$ R, and so on, the current flowing alternately in the field-magnet circuits coincident with the travel of the brush M. The generating-armature B, being influenced first by one set of field-magnet poles and then by the other, will of course deliver its current first through one set of commutator-brushes and then through the other, the currents in said armature rising and falling to correspond with the variations in its field of force.

Although, of course, any convenient means may be employed for rotating the brush R upon the commutator M between the stationary positive and negative brushes, and although I have stated that several methods of moving said brush are described in my patent No. 422,855, I have for convenience shown in Fig. 2 a specific means for accomplishing this purpose. In said Fig. 2, M represents the commutator of the exciter F, G and H the stationary commutator-brushes R, and the movable brush, which said brush is carried by an arm $r$, sleeved upon the armature-shaft of the said exciter and arranged to be driven independently thereof by means of a belt $t$, which passes over a pulley S connected with said arm $r$ and also sleeved upon said armature-shaft. The pulley S, arm $r$, and brush M are rotated at any desired speed by a belt-wheel T, over which the belt $t$ passes, and which may be driven by any convenient motor at any desired speed.

The field-magnet of the generator is, as illustrated, provided with four polar extensions $A'$ $A^2$ $A^3$ $A^4$. It will be understood, however, that actual polar extensions are not essential, and may therefore be dispensed with, if preferred, the mode of winding and the connections establishing consequent poles in the well-known manner.

As here shown, the single-coil machine E is connected to one working-circuit and receives each alternate current impulse applied by the generator. It will be obvious, therefore, that a generator designed to supply single-coil machines only, would require but one field-magnet circuit, the current in which should be caused to rise and fall substantially as set forth. It will also be understood that a modification of the generator here described would be embodied in a generating-machine having a stationary armature provided with commutator-brushes, substantially as herein set forth, the inducing member or field-magnet being caused to revolve exterior thereto or in inductive proximity.

Various other changes and modifications will suggest themselves and may be made by a skilled electrician in conformity with the principles herein set forth and without departing from the invention.

Having thus described my invention, what I claim, and desire to secure by Letters Patent, is—

1. A system of generating rising and falling currents, comprising a revolving armature of the continuous-current type rotating in a suitable field of force, and means for causing the magnetism of said field of force to rise and fall, reacting upon the armature to produce defined rising and falling currents therein.

2. The combination, with a generating-armature of the continuous-current type and one or more sets of brushes upon the commutator thereof, of working-circuits connected to said brushes, a multiple field-magnet for said armature having poles corresponding to the brushes upon the commutator, and means for energizing the same consecutively.

3. In a system of generating rising and falling currents, a revolving armature of the continuous-current type, having a sectional commutator and brushes thereon connected to the working circuit or circuits, multiple field-magnets for said armature, and means for energizing said field-magnets in alternation with rising and falling currents.

4. Means for supplying rising and falling currents to working-circuits, comprising a continuous-current armature having a sectional commutator, a set of commutator-brushes placed upon said commutator for each working-circuit, a field-magnet in inductive relation to the armature, energizing-circuits upon said field-magnet corresponding in number with the working-circuits, and means, substantially as described, for supplying rising and falling energizing-currents to the field-magnet circuits in alternation, substantially as described.

5. The combination, with a continuous-current armature, of two sets of commutator-brushes therefor, a working-circuit for each set of commutator-brushes, a double field-magnet in inductive proximity to the armature, the opposing poles of the field-magnets being in alternation, an energizing-circuit for each set of field-magnet poles, and means, substantially as described, for supplying current to the field-magnet circuits in alternation, and thereby causing the currents generated in the armature to flow alternately through the separate sets of commutator-brushes and to rise and fall therein.

6. In a generator for rising and falling currents, a field-magnet-energizing circuit or circuits, connections between one terminal of the field-magnet circuit or circuits and the stationary brushes of an exciter, an auxiliary brush or brushes upon the commutator of the exciter, said brush or brushes arranged to be constantly moved about the commutator toward and away from the points of maximum and zero electro-motive force, and connections between the other terminal or terminals of the field-magnet circuit and the said moving brush or brushes, substantially as described.

In testimony whereof I affix my signature in presence of two witnesses.

CHARLES J. VAN DEPOELE.

Witnesses:
 STEPHEN JANNUS,
 FRANKLAND JANNUS.